(12) United States Patent
Kogetsu et al.

(10) Patent No.: US 7,666,551 B2
(45) Date of Patent: Feb. 23, 2010

(54) POSITIVE ELECTRODE ACTIVE MATERIAL FOR NON-AQUEOUS ELECTROLYTE SECONDARY BATTERY, PRODUCTION METHOD THEREOF, AND NON-AQUEOUS ELECTROLYTE SECONDARY BATTERY USING THE SAME

(75) Inventors: Yasutaka Kogetsu, Suita (JP); Takaya Saito, Wakayama (JP); Yoshiyuki Ozaki, Wakayama (JP)

(73) Assignee: Panasonic Corporation, Osaka (JP)

( * ) Notice: Subject to any disclaimer, the term of this patent is extended or adjusted under 35 U.S.C. 154(b) by 1003 days.

(21) Appl. No.: 11/097,280

(22) Filed: Apr. 4, 2005

(65) Prior Publication Data
US 2005/0227147 A1  Oct. 13, 2005

(30) Foreign Application Priority Data
Apr. 8, 2004  (JP) .............................. 2004-113825

(51) Int. Cl.
H01M 4/58 (2010.01)
H01M 4/52 (2010.01)
(52) U.S. Cl. ................................. 429/231.95
(58) Field of Classification Search ................ None
See application file for complete search history.

(56) References Cited

U.S. PATENT DOCUMENTS

| | | | |
|---|---|---|---|
| 6,372,385 B1 | 4/2002 | Kweon et al. | |
| 6,749,965 B1 | 6/2004 | Kweon et al. | |
| 6,783,890 B2 | 8/2004 | Kweon et al. | |
| 2002/0071990 A1* | 6/2002 | Kweon et al. | ............ 429/231.1 |
| 2002/0127473 A1* | 9/2002 | Ooya et al. | ................. 429/232 |

FOREIGN PATENT DOCUMENTS

| | | |
|---|---|---|
| JP | 07-245105 | 9/1995 |
| JP | 2001-143703 | 5/2001 |
| KR | 2001-002784 A | 1/2001 |

* cited by examiner

Primary Examiner—Robert Hodge
(74) Attorney, Agent, or Firm—McDermott Will & Emery LLP

(57) ABSTRACT

A positive electrode active material for a non-aqueous electrolyte secondary battery of this invention includes: a lithium nickel composite oxide containing lithium, nickel, and at least one metal element other than lithium and nickel; and a layer containing lithium carbonate, aluminum hydroxide, and aluminum oxide, the layer being carried on the surface of the lithium nickel composite oxide. The lithium nickel composite oxide is composed such that the ratio of the nickel to the total of the nickel and the at least one metal element is 30 mol % or more. The layer is composed such that the amount of the lithium carbonate is 0.5 to 5 mol per 100 mol of the lithium nickel composite oxide. The total of aluminum atoms contained in the aluminum hydroxide and the aluminum oxide is 0.5 to 5 mol per 100 mol of the lithium nickel composite oxide.

4 Claims, 4 Drawing Sheets

POSITIVE ELECTRODE ACTIVE MATERIAL FOR NON-AQUEOUS ELECTROLYTE SECONDARY BATTERY, PRODUCTION METHOD THEREOF, AND NON-AQUEOUS ELECTROLYTE SECONDARY BATTERY USING THE SAME

BACKGROUND OF THE INVENTION

The present invention relates to a positive electrode active material for a non-aqueous electrolyte secondary battery and to a non-aqueous electrolyte secondary battery using the same.

Recently, electronic devices have rapidly been becoming portable and cordless, and there is accordingly a demand for secondary batteries that are small-sized and light-weight but have high energy density for use as the driving power sources of such devices. From such viewpoint, non-aqueous type secondary batteries, particularly lithium secondary batteries, are expected to be suited for use as the power sources for electronic devices, since they provide high voltage and high energy density.

Among such lithium secondary batteries, lithium ion secondary batteries, which use lithium cobaltate as a positive electrode active material and use carbon material capable of intercalating and deintercalating lithium ions as a negative electrode active material, have been developed and commercialized.

The operating potential of lithium cobaltate is approximately 4 V, relative to lithium metal. Thus, the voltage of such batteries becomes higher. Also, the negative electrode includes such carbon material as the negative electrode active material, thereby making use of intercalation reaction of lithium ions into the carbon material. Therefore, lithium dendrites, which occur when lithium metal is used as the negative electrode active material, are unlikely to form. This has made it possible to significantly resolve problems with respect to degradation of charge/discharge efficiency and safety.

On the other hand, in view of the estimated amount of cobalt deposits and the cost of cobalt, and further in terms of developing lithium ion secondary batteries with higher energy density, lithium nickel composite oxides have been under development as a substitute for lithium cobaltate.

Such lithium nickel composite oxides are used in large-sized lithium ion batteries for power storage and electric vehicles, which are required to offer long-term durability and safety.

However, non-aqueous electrolyte secondary batteries using a conventional lithium nickel composite oxide as the positive electrode active material may cause deterioration of life characteristics resulting from an increase in internal impedance, for example, when they are stored in a high-temperature environment. This increase in internal impedance leads to degradation of voltage characteristics and a significant reduction in the amount of energy the battery produces. Thus, suppressing the increase in internal impedance is an important problem to be solved in batteries using a lithium nickel composite oxide as the positive electrode active material, for example, batteries for electric vehicles, which are required to provide high output.

Meanwhile, lithium cobaltate and lithium nickelate have been researched as follows. For example, regarding the use of lithium cobaltate as the positive electrode active material, there has been proposed to provide aluminum oxide ($Al_2O_3$) particles on the surface of lithium cobaltate, in order to improve thermal stability and cycle characteristics during charging without lowering the discharge capacity and charge capacity of the battery (see Japanese Laid-Open Patent Publication No. 2001-143703). There has also been proposed to coat the surface of lithium nickelate with lithium carbonate, to improve the discharge characteristics of batteries including lithium nickelate as the positive electrode active material after high-temperature-storage (see Japanese Laid-Open Patent Publication No. Hei 7-245105).

However, there is a problem with the invention of Japanese Laid-Open Patent Publication No. 2001-143703. The problem is that since the active material is coated with aluminum oxide, lithium ions move slowly in the electric double layer formed in the electrolyte near the electrode, thereby resulting in deterioration of output characteristics (high-rate discharge characteristics) among initial characteristics.

Also, with respect to the invention of Japanese Laid-Open Patent Publication No. Hei 7-245105, the present inventors have found that the capacity improves when batteries are discharged at normal discharge rates after high temperature storage, but that there is still a problem in terms of high-rate discharge characteristics. This problem is thought to be caused by an increase in impedance during storage.

It is therefore an object of the present invention to provide a positive electrode active material capable of improving discharge characteristics, particularly output characteristics even after high-temperature storage, and a manufacturing method thereof, as well as a non-aqueous electrolyte secondary battery using such a positive electrode active material.

BRIEF SUMMARY OF THE INVENTION

The present invention relates to a positive electrode active material for a non-aqueous electrolyte secondary battery. This active material includes: a lithium nickel composite oxide containing lithium, nickel, and at least one metal element other than lithium and nickel; and a layer containing lithium carbonate, aluminum hydroxide, and aluminum oxide, the layer being carried on the surface of the lithium nickel composite oxide. The lithium nickel composite oxide is composed such that the ratio of the nickel to the total of the nickel and the at least one metal element is 30 mol % or more. The layer is composed such that the amount of the lithium carbonate is 0.5 to 5 mol per 100 mol of the lithium nickel composite oxide. The total of aluminum atoms contained in the aluminum hydroxide and the aluminum oxide is 0.5 to 5 mol per 100 mol of the lithium nickel composite oxide.

In the positive electrode active material for a non-aqueous electrolyte secondary battery, the lithium nickel composite oxide is preferably represented by the general formula:

$Li_aNi_{1-b}A_bO_2$

($0.98 \leq a \leq 1.1$, $0.03 \leq b \leq 0.7$, and A is at least one metal element selected from the group consisting of Co, Al, Ti, V, Cr, Mn, Fe and Y).

In the positive electrode active material for a non-aqueous electrolyte secondary battery, the lithium nickel composite oxide is more preferably represented by the general formula:

$Li_xNi_{1-y-z}Co_yM_zO_2$ ($0.98 \leq x \leq 1.1$, $0.1 \leq y \leq 0.35$, $0.03 \leq z \leq 0.35$, and M is at least one metal element selected from the group consisting of Al, Ti, V, Cr, Mn, Fe and Y).

The present invention also relates to a method for producing a positive electrode active material for a non-aqueous electrolyte secondary battery. This method includes the following steps (a) to (c). In the step (a), a lithium nickel composite oxide represented by the general formula:

$Li_aNi_{1-b}A_bO_2$ ($0.98 \leq a \leq 1.1$, $0.03 \leq b \leq 0.7$, and A is at least one metal element selected from the group consisting of Co, Al, Ti, V, Cr, Mn, Fe and Y) is synthesized from a nickel composite hydroxide or a nickel composite oxide represented by the general formula:

$Ni_{1-b}A_b(OH)_2$ or $Ni_{1-b}A_bO$ ($0.03 \leq b \leq 0.7$, and A is at least one metal element selected from the group consisting of Co, Al, Ti, V, Cr, Mn, Fe and Y) and a lithium compound. In the step (b), the lithium nickel composite oxide obtained in the step (a) and aluminum metal are added to a predetermined amount of water, and the aluminum metal is dissolved, to obtain a mixture containing the lithium nickel composite oxide and alminate ions. In the step (c), the mixture is dried to obtain the lithium nickel composite oxide with a layer containing lithium carbonate, aluminum hydroxide and aluminum oxide on the surface.

In the method for producing a positive electrode active material for a non-aqueous electrolyte secondary battery, the step (a) is preferably a step of synthesizing a lithium nickel composite oxide represented by the general formula:

$Li_xNi_{1-y-z}Co_yM_zO_2$ ($0.98 \leq x \leq 1.1$, $0.1 \leq y \leq 0.35$, $0.03 \leq z \leq 0.35$, and M is at least one metal element selected from the group consisting of Al, Ti, V, Cr, Mn, Fe and Y) from a nickel composite hydroxide or a nickel composite oxide represented by the general formula: $Ni_{1-y-z}Co_yM_z(OH)_2$ or $Ni_{1-y-z}Co_yM_zO$ ($0.1 \leq y \leq 0.35$, $0.03 \leq z \leq 0.35$, and M is at least one metal element selected from the group consisting of Al, Ti, V, Cr, Mn, Fe and Y) and a lithium compound.

In the method for producing a positive electrode active material for a non-aqueous electrolyte secondary battery, the aluminum metal preferably has a mean particle size of 0.1 to 100 μm.

In the method for producing a positive electrode active material for a non-aqueous electrolyte secondary battery, the amount of the aluminum metal added to the predetermined amount of water in the step (b) is preferably 0.5 to 5 mol per 100 mol of the lithium nickel composite oxide.

Also, the present invention pertains to a non-aqueous electrolyte secondary battery including: a positive electrode including the above-mentioned positive electrode active material; a negative electrode including at least one of lithium metal, a lithium alloy and a material capable of absorbing and desorbing lithium ions; and an electrolyte comprising a non-aqueous solvent and a lithium salt dissolved in the non-aqueous solvent.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

A positive electrode active material for a non-aqueous electrolyte secondary battery in accordance with the present invention includes: a lithium nickel composite oxide containing lithium, nickel, and at least one metal element other than lithium and nickel; and a layer containing lithium carbonate, aluminum hydroxide and aluminum oxide, the layer being carried on the surface of the lithium nickel composite oxide. This layer may be carried on at least part of the surface of the lithium nickel composite oxide or may be carried on the whole surface of the lithium nickel composite oxide.

Figure 1:
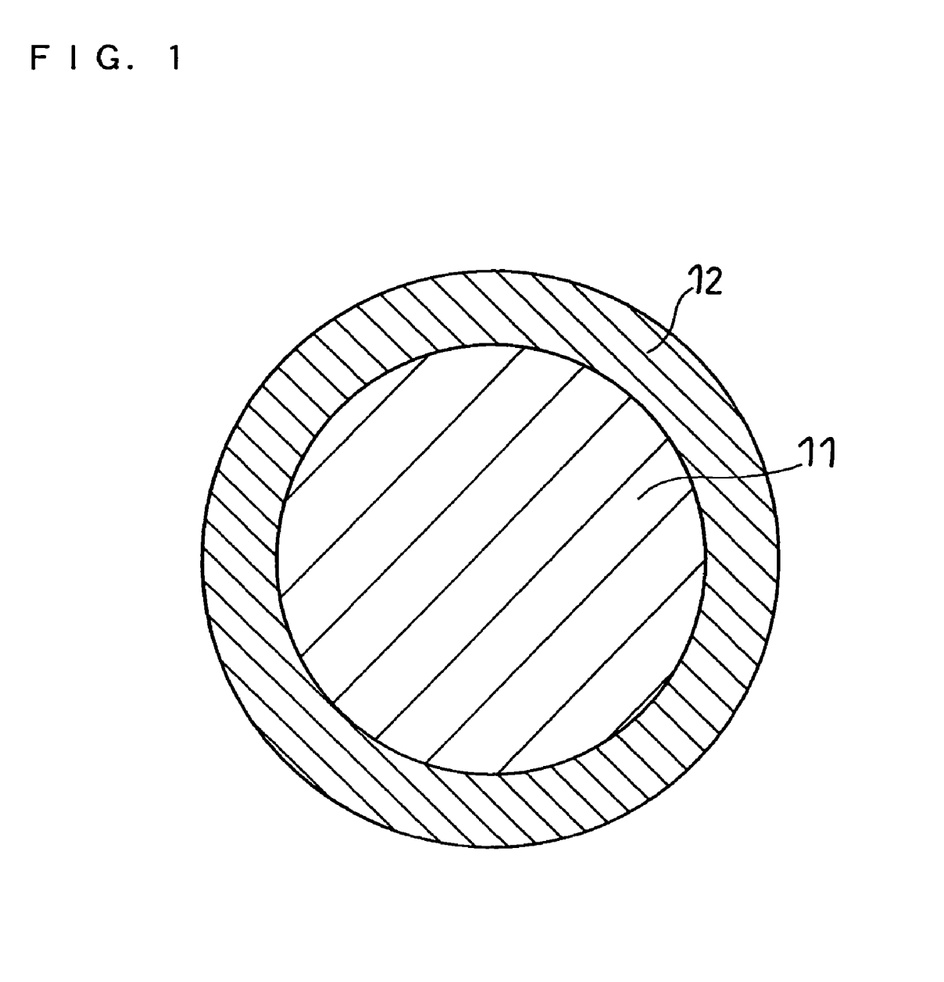
FIG. 1 is a schematic cross-sectional view of a positive electrode active material according to one embodiment of the present invention.

FIG. 1 is a schematic cross-sectional view of a lithium nickel composite oxide with a layer containing lithium carbonate, aluminum hydroxide and aluminum oxide according to one embodiment of the present invention. In FIG. 1, the surface of a lithium nickel composite oxide particle 11 is covered with a layer 12 containing lithium carbonate, aluminum hydroxide and aluminum oxide.

As described above, in the lithium nickel composite oxide particle with the layer containing lithium carbonate, aluminum hydroxide and aluminum oxide on the surface, the aluminum oxide and the aluminum hydroxide contained in the layer are thought to suppress the irreversible reaction between the lithium nickel composite oxide and an electrolyte. That is, the layer functions as a protective film that prevents the formation of a film made of electrolyte components on the surface of the lithium nickel composite oxide.

Further, when the lithium carbonate contained in the layer comes into contact with an electrolyte, the ionic bond between a carbonate ion and a lithium ion becomes weak. Thus, if lithium ions in the electrolyte enter the layer, they replace lithium of the lithium carbonate one after another, so that the lithium ions can diffuse in the layer. It is presumed that the diffusion path of lithium is secured as described above, thereby leading to an improvement in lithium ion permeability of the layer.

In the layer, the content of lithium carbonate is 0.5 to 5 mol per 100 mol of the lithium nickel composite oxide. If the lithium carbonate content is less than 0.5 mol, aluminum hydroxide and aluminum oxide make up a major proportion of the layer, and the lithium carbonate proportion serving as the lithium ion diffusion path becomes too small, which may result in an increase in impedance. If the lithium carbonate content is greater than 5 mol, the lithium carbonate proportion of the layer increases, so that the lithium ion diffusion path becomes longer. This may result in an increase in diffusion resistance and therefore impedance.

Also, in the layer, the total of aluminum atoms contained in the aluminum hydroxide and the aluminum oxide is 0.5 to 5 mol per 100 mol of the lithium nickel composite oxide. If the total of aluminum atoms contained in the aluminum hydroxide and the aluminum oxide is less than 0.5 mol, such layer does not function sufficiently as the protective film, which may impair the effect of improving the shortening of life. If the total exceeds 5 mol, the layer containing aluminum oxide, aluminum hydroxide and lithium carbonate becomes too thick, so that the resistance increases, which may result in deterioration in initial characteristics.

The above-mentioned lithium nickel composite oxide has excellent high-rate characteristics after storage and the like. Examples of such lithium nickel composite oxide include lithium nickel composite oxides (hereinafter referred to as lithium nickel composite oxides (A)) represented by the general formula (A): $Li_aNi_{1-b}A_bO_2$ (0.98≦a≦1.1, 0.03≦b≦0.7, and A is at least one metal element selected from the group consisting of Co, Al, Ti, V, Cr, Mn, Fe and Y).

The lithium nickel composite oxides (A) have excellent high-rate characteristics after storage. Further, in the lithium nickel composite oxides (A), 3 mol % to 70 mol % of Ni atoms are substituted by at least one metal element A selected from the group consisting of Co, Al, Ti, V, Cr, Mn, Fe and Y. If the amount of substituted metal element A is less than 3 mol %, the crystal structure changes greatly upon charge and discharge, resulting in deterioration in charge/discharge cycle characteristics. If the amount of substituted metal element A exceeds 70 mol %, the initial capacity lowers.

Among the lithium nickel composite oxides (A), lithium nickel composite oxides (hereinafter referred to as lithium nickel composite oxide (B)) represented by the general formula (B): $Li_xNi_{1-y-z}Co_yM_zO_2$ (0.98≦x≦1.1, 0.1≦y≦0.35, 0.03≦z≦0.35, and M is at least one metal element selected from the group consisting of Al, Ti, V, Cr, Mn, Fe and Y) are more preferably used.

In the lithium nickel composite oxides (B), 10 to 35 mol % of Ni atoms are substituted by Co atoms. If the amount of substituted Co is 10 mol % or more, the change in crystal structure upon charge and discharge is lessened, so that cycle characteristics can be improved. If the substituted amount is 35 mol % or less, the decrease of initial capacity can be suppressed.

Also, in the lithium nickel composite oxides (B), 3 mol % to 35 mol % of Ni atoms are substituted by at least one metal element M selected from the group consisting of Al, Ti, V, Cr, Mn, Fe and Y. If the amount of substituted metal element M is less than 3 mol %, the resultant crystal structure is not sufficiently stable, so that the effects of improving cycle characteristics and storage characteristics can not be obtained. If the amount of substituted metal element M is greater than 35 mol %, various battery characteristics lower remarkably in the initial stage of discharging because of solid solubility limit.

Further, among the metal elements M, Al provides excellent high-rate characteristics even after storage. Therefore, Al is particularly desirable, and the substituted amount is preferably 3 mol % to 35 mol %.

Also, in the lithium nickel composite oxides (A) and (B), the molar ratio x of lithium is 0.98 to 1.1. If x is less than 0.98, or if x is greater than 1.1, initial capacity lowers.

It should be noted that the molar ratio x of lithium is a value upon synthesis of a lithium nickel composite oxide (A) or (B), and that the molar ratio x varies upon charge and discharge.

The mean particle size of the lithium nickel composite oxides is preferably 1 μm to 30 μm. If the mean particle size is less than 1 μm, such lithium nickel composite oxide particles tend to agglomerate, so that it may become difficult to ensure that lithium nickel composite oxide particles are dispersed when they are mixed with a binder, a conductive agent, etc. If the mean particle size exceeds 30 μm, the electronic conductivity inside the lithium nickel composite oxide particle lowers, which may result in an increase in initial impedance.

As described above, when the lithium nickel composite oxide with suppressed capacity deterioration after cycles and improved capacity, etc., is provided with the above-mentioned layer having high lithium ion permeability and a function as a protective film, it becomes possible to significantly improve discharge characteristics, particularly output characteristics, even after high-temperature storage.

Also, the positive electrode active material according to the present invention may be used in combination with at least one of other positive electrode active materials (e.g., $LiCoO_2$).

A method for producing the positive electrode active material for a non-aqueous electrolyte lithium secondary battery according to the present invention is described hereinafter.

First, the above-mentioned lithium nickel composite oxide is synthesized from a nickel composite hydroxide represented by the general formula (C): $Ni_{1-b}A_b(OH)_2$ or a nickel composite oxide represented by the general formula (D): $Ni_{1-b}A_bO$, and a lithium compound (step (a)). Therein, in the nickel composite hydroxide and the nickel composite oxide, 0.03≦b≦0.7, and A is at least one metal element selected from the group consisting of Co, Al, Ti, V, Cr, Mn, Fe and Y.

In the step (a), for example, a lithium nickel composite oxide (A) can be synthesized as follows. The above-mentioned nickel composite hydroxide or nickel composite oxide and a lithium compound are mixed together in a predetermined mixing ratio, to obtain a mixture. This mixture is baked in an oxygen atmosphere at 700 to 850° C., whereby a lithium nickel composite oxide (A) can be obtained.

The above-mentioned lithium compound is preferably lithium hydroxide that is highly reactive.

Further, in the step (a), among the above-mentioned lithium nickel composite oxides (A), a lithium nickel composite oxide (B) represented by $Li_xNi_{1-y-z}Co_yM_zO_2$ (0.98≦x≦1.1, 0.1≦y≦0.35, 0.03≦z≦0.35, and M is at least one metal element selected from the group consisting of Al, Ti, V, Cr, Mn, Fe and Y) may also be synthesized.

For example, a lithium nickel composite oxide (B) can be synthesized from a nickel composite hydroxide represented by the general formula (E): $Ni_{1-y-z}Co_yM_z(OH)_2$ or a nickel composite oxide represented by the general formula (F): $Ni_{1-y-z}Co_yM_zO$, and a lithium compound, in the same manner as the synthesis of the lithium nickel composite oxide (A). Therein, in the nickel composite hydroxide (E) and the nickel composite oxide (F), 0.1≦y≦0.35, 0.03≦z≦0.35, and M is at least one metal element selected from the group consisting of Al, Ti, V, Cr, Mn, Fe and Y.

It should be noted that the lithium nickel composite oxide (A) or (B) may be produced by other methods than the above method.

Further, in using the lithium nickel composite oxide (B), the following steps (b) to (c) are the same as those in using the lithium nickel composite oxide (A).

Thereafter, a predetermined amount of the lithium nickel composite oxide obtained in the above step (a) and a predetermined amount of aluminum metal particles are put into a predetermined amount of water, and the water is then stirred. At this time, lithium hydroxide contained in the lithium nickel composite oxide, which did not react upon the synthesis of the lithium nickel composite oxide, is dissolved in water. Further, the lithium nickel composite oxide reacts with water, so that lithium ions are exchanged with protons and the lithium ions migrate into the water. As a result, this water becomes an aqueous lithium hydroxide solution having an alkalinity of pH 11 to 13. The aluminum metal particles react with hydroxide ions contained in the water, thereby dissolving as alminate ions ($AlO_2^-$). In this way, a mixture containing the lithium nickel composite oxide and the alminate ions is obtained (step (b)).

Also, in the step (b), the lithium nickel composite oxide and the aluminum metal may be added together with a hydroxide such as lithium hydroxide, in order to dissolve the aluminum metal.

The aluminum metal particles react with the hydroxide ions and readily dissolve; however, in consideration of productivity and ease of handling, the particle size of the aluminum metal particles is preferably 0.1 µm to 100 µm. If the mean particle size is larger than 100 µm, the whole particles may remain undissolved. Further, if the mean particle size is less than 0.1 µm, production of such particles is difficult, and there may arise a problem of fine particle management.

Also, the time it takes for the aluminum metal particles to dissolve is dependent on the mean particle size. If the mean particle size is 100 µm or less, such particles dissolve within 3 hours. It is preferred that the aluminum metal particles be dissolved by stirring them.

Further, the water used for dissolving the aluminum metal particles is preferably ion exchange water containing no impurities. The reason is as follows. When tap water, for example, is used, the tap water contains chloride ions. Thus, if charge/discharge is performed with the chloride ions remaining in the positive electrode active material, the chloride ions may become a cause to produce gas. Also, the amount of the water is preferably 50 to 200 parts by weight per 100 parts by weight of the lithium nickel composite oxide.

Furthermore, in the step (b), the amount of the aluminum metal particles contained in the predetermined amount of water is preferably 0.5 to 5 mol per 100 mol of the lithium nickel composite oxide.

Thereafter, the mixture obtained in the step (b) is dried. Then, the alminate ions are hydrolyzed, so that aluminum hydroxide is produced on the surface of the lithium nickel composite oxide. When the mixture is further dried, part of the aluminum hydroxide changes into aluminum oxide. During the drying, lithium hydroxide present in the mixture reacts with carbon dioxide in the air, thereby producing lithium carbonate. In this way, the surface of the lithium nickel composite oxide is coated with a layer containing aluminum hydroxide, aluminum oxide and lithium carbonate (step (c)).

In the step (c), the drying time is preferably 20 hours or less. Although it depends on the drying conditions, if drying is performed for more than 20 hours, it is difficult to evenly perform drying, so that reaction such as hydrolysis proceeds unevenly. Therefore, homogeneous material cannot be produced. Further, the productivity is also poor, thereby resulting in high manufacturing costs.

Further, the drying temperature is preferably 80 to 100° C. If the drying temperature is lower than 80° C., such drying takes a long time, which is inappropriate. If the heating temperature is higher than 100° C., the reaction may proceed unevenly due to the boiling of water, which is inappropriate.

Furthermore, the amount of the added aluminum metal substantially agrees with the amount of the aluminum constituting the aluminum hydroxide and aluminum oxide contained in the above-mentioned layer. Thus, in the present invention, the aluminum metal added to the predetermined amount of water, i.e., all the aluminum metal dissolved in the water, can be regarded as being included in the aluminum hydroxide and aluminum oxide contained in the layer carried on the active material surface.

The ratio between the aluminum hydroxide and the aluminum oxide in the coating layer is dependent on the water amount, the drying temperature, the drying time, etc. In the present invention, it is preferred that 30 to 90 mol % of the added aluminum metal constitute the aluminum of the aluminum oxide. In the above-mentioned layer, aluminum hydroxide is oxidized to aluminum oxide. This oxidization involves generation of a very small mount of gas, thereby forming suitable voids in the coating layer. Consequently, Li ion diffusion paths are created. As described, the co-existence of aluminum hydroxide and aluminum oxide makes it possible to produce an electrode with lower resistance than the use of only aluminum oxide for forming a coating layer.

It should be noted that aluminum hydroxide and aluminum oxide are in equilibrium under common drying conditions (approximately up to 200° C.). Thus, all the aluminum hydroxide does not change into aluminum oxide.

By the respective steps as described above, the surface of the lithium nickel composite oxide particle is evenly coated with aluminum hydroxide, aluminum oxide and lithium carbonate, without local unevenness.

The present invention is hereinafter described by way of Examples.

EXAMPLE 1

(Battery A)

Figure 2:
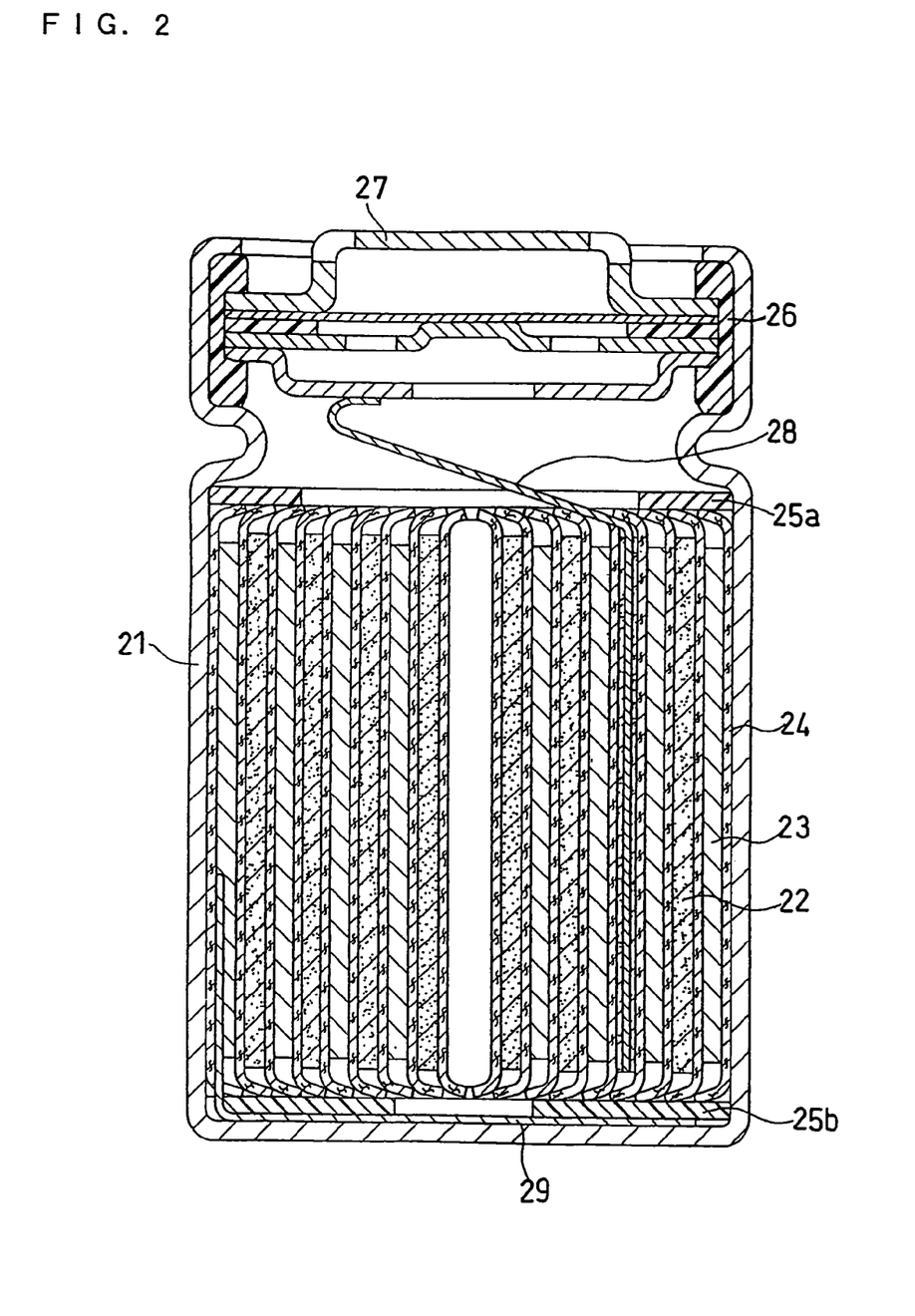
FIG. 2 is a schematic longitudinal sectional view of a cylindrical battery used in Examples of the present invention.

In this example, a cylindrical non-aqueous electrolyte secondary battery as illustrated in FIG. 2 was produced. The non-aqueous electrolyte secondary battery of FIG. 2 includes a stainless steel case 21 and an electrode plate group accommodated in the case 21. The electrode plate group is formed of a positive electrode 22, a negative electrode 23, and a polyethylene separator 24, and the positive electrode 22 and the negative electrode 23 are spirally rolled up with the separator 24 interposed therebetween. The upper and lower parts of the electrode plate group are fitted with an upper insulator plate 25a and a lower insulator plate 25b, respectively. The opening of the case 21 is sealed by crimping the opening edge of the case 21 onto an assembled sealing plate 27, with a gasket 26 fitted therebetween. Also, one end of an aluminum positive electrode lead 28a is attached to the positive electrode 22, and the other end of the positive electrode lead 28 is connected to the assembled sealing plate 27, which doubles as the positive electrode terminal. One end of a nickel negative electrode lead 29 is attached to the negative electrode 23, and the other end of the negative electrode lead 29 is connected to the case 21, which doubles as the negative electrode terminal.

The positive electrode 22 includes a positive electrode active material for a non-aqueous electrolyte secondary battery according to the present invention. This positive electrode active material was prepared as follows.

(Preparation of Positive Electrode Active Material)

A nickel composite hydroxide represented by $Ni_{0.75}Co_{0.2}Al_{0.05}(OH)_2$ and lithium hydroxide monohydrate ($LiOH \cdot H_2O$) were mixed together at Li:Ni:Co:Al=1.08:0.75:0.2:0.05 (molar ratio), to obtain a mixture. This mixture was put into an alumina container and heated in an oxygen atmosphere in an electric furnace at 800° C. for 15 hours, to react the lithium composite hydroxide with the lithium hydroxide.

In this way, a lithium nickel composite oxide X represented by $Li_{1.08}Ni_{0.75}Co_{0.2}Al_{0.05}O_2$ was obtained. The mean particle size of this lithium nickel composite oxide was 10 µm, and this also holds true of the following examples.

Next, 1 kg of the lithium nickel composite oxide X and 1.4 g of aluminum metal powder were put into 1 L of ion exchange water, to obtain a mixture (the amount 1.4 g of the aluminum metal powder corresponds to 0.5 mol per 100 mol of the lithium nickel composite oxide, i.e., 0.5 mol %). This mixture was stirred for 3 hours to dissolve the aluminum metal, which gave a slurry with a solid content of the lithium nickel composite oxide X. The aluminum metal powder used in this process had a mean particle size of 50 µm based on the volume.

The measurement of the mean particle size was performed, using a particle size distribution analyzer (LA-920, manufactured by Horiba, Ltd.).

Part of the slurry obtained in the above manner was taken out and examined to determine whether or not the added aluminum metal was dissolved, using an $Al^{27}$-NMR analyzer (INOVA400, manufactured by Varian Japan). As a result, it was confirmed that all the aluminum metal particles were dissolved.

Subsequently, the slurry was dried at 80° C. for 10 hours, to obtain a lithium nickel composite oxide whose surface was coated with a layer containing aluminum hydroxide, aluminum oxide and lithium carbonate. This was named a positive electrode active material X'.

A section of the positive electrode active material X' was examined with an electron probe microanalyzer (EPMA) (JXA-8900, manufactured by Japan Electron Optics Laboratory Co., Ltd.), to perform a quantitative analysis of aluminum element and carbon element. As a result, it was confirmed that the positive electrode active material X' was coated with aluminum hydroxide, aluminum oxide and lithium carbonate.

Using this positive electrode active material X', a positive electrode was prepared as follows.

First, 100 parts by weight of the positive electrode active material X' was mixed with 3 parts by weight of acetylene black (AB)(conductive agent) and an N-methylpyrrolidone (NMP) solution dissolving polyvinylidene fluoride (PVDF) (binder) such that the amount of PVDF was 4 parts by weight, to obtain a paste. This paste was applied onto both sides of an aluminum foil, dried, and rolled, to obtain a positive electrode plate of 0.075 mm in thickness, 37 mm in width, and 300 mm in length.

A negative electrode was prepared as follows.

Non-graphitizable carbon with a mean particle size of 10 μm obtained by heat-treating isotropic pitch at 1000° C. was used as the negative electrode active material.

100 parts by weight of this carbon powder was mixed with an NMP solution dissolving PVDF (binder) such that the amount of PVDF was 8 parts by weight, to obtain a paste. This paste was applied onto both sides of a copper foil, dried, and rolled, to obtain a negative electrode plate of 0.1 mm in thickness, 39 mm in width, and 340 mm in length.

Thereafter, an aluminum lead was attached to the positive electrode, while a nickel lead was attached to the negative electrode. These positive and negative electrodes were spirally rolled up with a polyethylene separator of 0.025 mm in thickness, 45 mm in width, and 740 mm in length interposed therebetween, to obtain an electrode plate group. This electrode plate group was placed into a battery case of 17.5 mm in diameter and 50 mm in height.

A predetermined amount of an electrolyte was injected into the battery case accommodating the electrode plate group. The opening of the battery case was then sealed with a sealing plate, to complete a battery. This battery was named battery A.

The electrolyte used in this battery was prepared by dissolving lithium hexafluorophosphate ($LiPF_6$) in a solvent mixture composed of propylene carbonate (PC) and dimethyl carbonate (DMC) in a volume ratio of 1:1 at a concentration of 1 mol/L.

(Battery B)

In preparing the positive electrode active material X', the amount of aluminum metal powder added was changed to 8.4 g (corresponding to 3 mol %). A non-aqueous electrolyte secondary battery was produced in the same manner as the battery A except for this change. This battery was named battery B.

(Battery C)

In preparing the positive electrode active material X', the amount of aluminum metal powder added was changed to 14 g (corresponding to 5 mol %). A non-aqueous electrolyte secondary battery was produced in the same manner as the battery A except for this change. This battery was named battery C.

(Comparative Battery D)

In preparing the positive electrode active material X', the amount of aluminum metal powder added was changed to 28 g (corresponding to 10 mol %). Also, the aluminum metal powder was dissolved in an aqueous lithium hydroxide solution (1 L) dissolving lithium hydroxide at a concentration of 1 mol/l, instead of ion exchange water. A non-aqueous electrolyte secondary battery was produced in the same manner as the battery A except for these changes. This battery was named comparative battery D.

(Comparative Battery E)

The lithium nickel composite oxide X, instead of the lithium nickel composite oxide X', was used as the positive electrode active material. Aside from this, a non-aqueous electrolyte secondary battery was produced in the same manner as the battery A. This battery was named comparative battery E.

(Comparative Battery F)

1 kg of the lithium nickel composite oxide X and 12.4 g of lithium hydroxide (corresponding to 5 mol %) were put into 1 L of ion exchange water and stirred for 3 hours, to obtain a slurry. This slurry was then dried at 80 for 10 hours, to form a layer containing lithium carbonate on the surface of the lithium nickel composite oxide X. A non-aqueous electrolyte secondary battery was produced in the same manner as the battery A, except for the use of such a lithium nickel composite oxide as the positive electrode active material. This battery was named comparative battery F.

(Comparative Battery G)

The lithium nickel composite oxide X was put into ion exchange water, stirred, dehydrated by centrifugation, and dried, to remove unreacted lithium. Thereafter, the resultant lithium nickel composite oxide X and sodium aluminate were put into 1 L of ion exchange water in a ratio of 100 mol composite oxide X to 5 mol sodium aluminate, and stirred for 3 hours, to obtain a slurry. This slurry was dried at 80° C. for 10 hours, to obtain a lithium nickel composite oxide with a layer containing aluminum hydroxide and aluminum oxide, which serves as the positive electrode active material. Using this positive electrode active material, a non-aqueous electrolyte secondary battery was produced in the same manner as the battery A. This battery was named comparative battery G.

(Comparative Battery H)

A lithium composite hydroxide represented by $Ni_{0.75}Co_{0.2}Al_{0.05}(OH)_2$ and lithium hydroxide monohydrate ($LiOH.H_2O$) were mixed such that Li:Ni:Co:Al=1.1:0.75:0.2:0.05 (molar ratio), to obtain a mixture. This mixture was put into an alumina container, and heated in an oxygen atmosphere in an electric furnace at 800° C. for 15 hours, to react the lithium composite hydroxide with lithium hydroxide.

In this way, a lithium nickel composite oxide Z represented by $Li_{1.1}Ni_{0.75}Co_{0.2}Al_{0.05}O_2$ was obtained.

Subsequently, 1 kg of the lithium nickel composite oxide Z and 14 g of aluminum metal powder with a mean particle size of 50 μm (corresponding to 5 mol %) were put into 5 L of ion exchange water, to obtain a mixture. This mixture was stirred for 3 hours, to obtain a slurry. This slurry was dried at 80 for 10 hours, to obtain a lithium nickel composite oxide whose surface was coated with aluminum hydroxide, aluminum oxide and lithium carbonate, which serves as the positive electrode active material Z'.

Using the positive electrode active material Z', a non-aqueous electrolyte secondary battery was produced in the same manner as the battery A. This battery was named comparative battery H.

The positive electrode active materials of the batteries A to H were examined by X-ray diffraction analysis to determine whether or not aluminum oxide, aluminum hydroxide, and lithium carbonate were present. The content of lithium carbonate was determined from the peak intensity of lithium carbonate, using a predetermined calibration curve. In the X-ray diffraction pattern, the peak of lithium carbonate appears around 30.60° and around 31.8°.

The X-ray diffraction analysis was performed at a measurement temperature of 25° C. with an X-ray diffractometer (X'Pert, manufactured by Philips) using CuKα rays.

Figure 3:
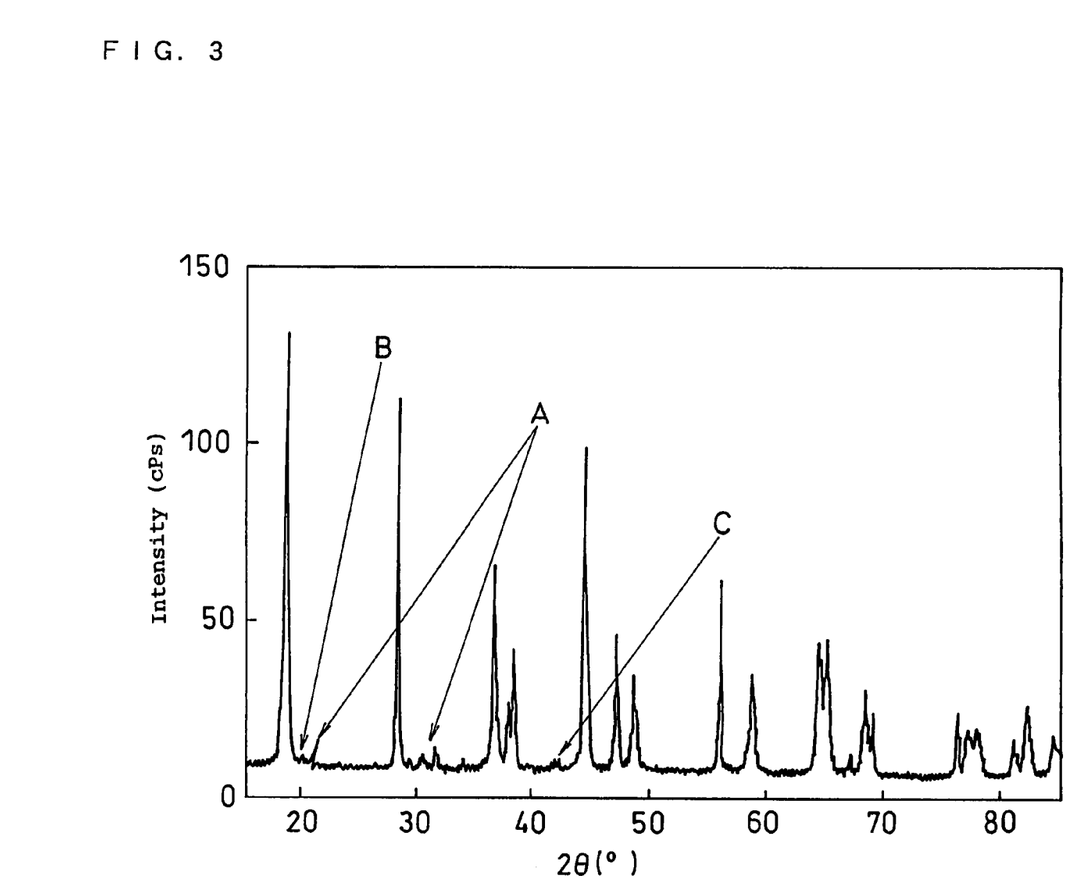
FIG. 3 shows an X-ray diffraction pattern of an active material used in battery B produced in an Example of the present invention.
Figure 4:
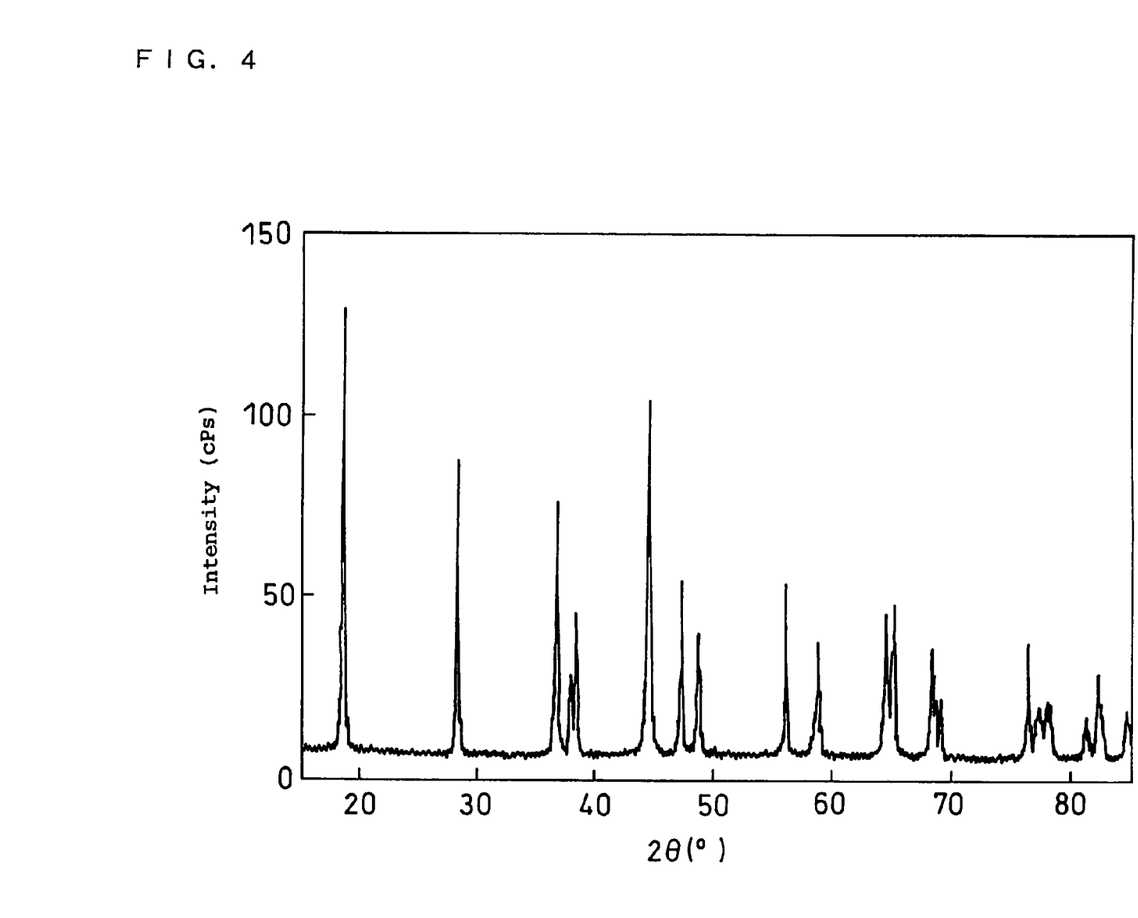
FIG. 4 shows an X-ray diffraction pattern of an active material used in comparative battery E produced in an Example of the present invention.

An X-ray diffraction pattern of the positive electrode active material of the battery B is shown in FIG. 3 as one example, while an X-ray diffraction pattern of the positive electrode active material of comparative battery E is shown in FIG. 4.

FIG. 3 has peaks attributed to lithium carbonate (A), aluminum hydroxide (B) and aluminum hydroxide (C), thereby confirming that lithium carbonate, aluminum hydroxide and aluminum hydroxide are present. On the other hand, FIG. 4 confirmed the presence of only the lithium nickel composite oxide.

Further, the results of the X-ray diffraction analysis confirmed that the amount of the added aluminum metal agreed with the total amount of aluminum constituting the aluminum hydroxide and aluminum oxide contained in the coating layer.

Table 1 shows the amount of aluminum metal added per 100 mol of the lithium nickel composite oxide and the content of lithium carbonate per 100 mol of the lithium nickel composite oxide.

TABLE 1

| | Amount of Al metal added per 100 mol of lithium nickel composite oxide (mol) | Content of lithium carbonate per 100 mol of lithium nickel composite oxide (mol) |
| --- | --- | --- |
| Battery A | 0.5 | 0.5 |
| Battery B | 3 | 2.1 |
| Battery C | 5 | 5 |
| Comparative Battery D | 10 | 5.5 |
| Comparative Battery E | 0 | 0 |
| Comparative Battery F | 0 | 3 |
| Comparative Battery G | 5 | 0.3 |
| Comparative Battery H | 5 | 6 |

(Evaluation)

Each of the batteries A to H obtained in the above manner was charged at a charge current of 50 mA at an ambient temperature of 25° C. up to an end-of-charge voltage of 4.2 V, and then discharged at a discharge current of 50 mA down to an end-of-discharge voltage of 2.5 V. This cycle was repeated 5 times. Subsequently, each battery was charged such that its charging rate was 60%. Thereafter, the impedance was measured at a frequency of 0.1 Hz by an alternating-current impedance method.

After the measurement of the impedance, the battery was charged at a current of 50 mA up to an end-of-charge voltage of 4.2 V. The charged battery was stored at 60° C. for 56 days.

After the storage, each battery was subjected to the above-described charge/discharge cycle 5 times, and then charged in the above manner such that the charging rate was 60%. The charged battery was measured for its impedance at a frequency of 0.1 Hz. The measured impedance value correlates with output characteristics, which are required, for example, in electric vehicles. The lower the impedance value is, the better the output characteristics are.

Table 2 shows the results. Table 2 shows initial capacity, impedance before and after storage, and rate of impedance increase after storage relative to impedance before storage.

(rate of impedance increase)=(([impedance after storage]−[impedance before storage])×100/[impedance before storage]).

TABLE 2

| | Initial capacity (mAh) | Impedance before storage (Ω) | Impedance after storage (Ω) | Rate of impedance increase (%) |
| --- | --- | --- | --- | --- |
| Battery A | 250 | 70.2 | 74.0 | 5.4 |
| Battery B | 249 | 71.0 | 73.3 | 3.2 |
| Battery C | 239 | 76.5 | 78.4 | 2.5 |
| Comparative Battery D | 180 | 95.0 | 97.4 | 2.5 |
| Comparative Battery E | 252 | 66.5 | 80.3 | 20.8 |
| Comparative Battery F | 210 | 72.0 | 86.4 | 20.0 |
| Comparative Battery G | 243 | 92.0 | 100 | 8.7 |
| Comparative Battery H | 179 | 98.0 | 99.0 | 1.0 |

As is shown in Table 2, the batteries in which the layer coating the surface of the lithium nickel composite oxide contains aluminum oxide, aluminum hydroxide and lithium carbonate, exhibit smaller rates of impedance increase and less battery deterioration after storage, than the comparative battery E, which contains only the lithium nickel composite oxide as the positive electrode active material, and the comparative battery F, in which the coating layer contains only lithium carbonate.

On the other hand, the comparative battery D, in which the total of aluminum atoms contained in the aluminum oxide and aluminum hydroxide constituting the coating layer is 10 mol, had an decreased initial capacity.

Therefore, the total of aluminum atoms contained in the aluminum oxide and aluminum hydroxide constituting the coating layer needs to be 0.5 to 5 mol per 100 mol of the lithium nickel composite oxide.

Further, the results of the comparative battery G have shown that when the amount of lithium carbonate is less than 0.5 mol per 100 mol of the lithium nickel composite oxide, the initial resistance increases. Also the results of the comparative battery H have indicated that the amount of lithium carbonate is larger than 5 mol per 100 mol of the lithium nickel composite oxide, the initial capacity decreases.

Accordingly, the amount of lithium carbonate contained in the layer formed on the surface of the lithium nickel composite oxide needs to be 0.5 to 5 mol per 100 mol of the lithium nickel composite oxide.

EXAMPLE 2

This example examined cases where the contents of Co and Al in the lithium nickel composite oxide of Example 1 were varied.

(Battery I)

A nickel composite hydroxide represented by $Ni_{0.87}Co_{0.1}Al_{0.03}(OH)_2$ and lithium hydroxide monohydrate ($LiOH.H_2O$) were mixed such that Li:Ni:Co:Al=1.08:0.87:0.1:0.03 (molar ratio), to obtain a mixture. A non-aqueous electrolyte secondary battery was produced in the same manner as the battery A except for the use of this mixture. This battery was named battery I. The lithium nickel composite oxide used is represented by $Li_{1.08}Ni_{0.87}Co_{0.1}Al_{0.03}O_2$.

(Battery J)

A nickel composite hydroxide represented by $N_{0.62}Co_{0.35}Al_{0.03}(OH)_2$ and lithium hydroxide monohydrate ($LiOH.H_2O$) were mixed such that Li:Ni:Co:Al=1.08:0.62:0.35:0.03 (molar ratio), to obtain a mixture. A non-aqueous electrolyte secondary battery was produced in the same manner as the battery A except for the use of this mixture. This battery was named battery J. The lithium nickel composite oxide used is represented by $Li_{1.08}Ni_{0.62}Co_{0.35}Al_{0.03}O_2$.

(Battery K)

A nickel composite hydroxide represented by $Ni_{0.55}Co_{0.1}Al_{0.35}(OH)_2$ and lithium hydroxide monohydrate ($LiOH.H_2O$) were mixed such that Li:Ni:Co:Al=1.08:0.55:0.1:0.35 (molar ratio), to obtain a mixture. A non-aqueous electrolyte secondary battery was produced in the same manner as the battery A except for the use of this mixture. This battery was named battery K. The lithium nickel composite oxide used is represented by $Li_{1.08}Ni_{0.55}Co_{0.1}Al_{0.35}O_2$.

(Battery L)

A nickel composite hydroxide represented by $Ni_{0.3}Co_{0.35}Al_{0.35}(OH)_2$ and lithium hydroxide monohydrate ($LiOH.H_2O$) were mixed such that Li:Ni:Co:Al=1.08:0.3:0.35:0.35 (molar ratio), to obtain a mixture. A non-aqueous electrolyte secondary battery was produced in the same manner as the battery A except for the use of this mixture. This battery was named battery L. The lithium nickel composite oxide used is represented by $Li_{1.08}Ni_{0.3}Co_{0.35}Al_{0.35}O_2$.

The batteries I to L obtained in the above manner were evaluated in the same manner as in Example 1. Table 3 shows the results.

TABLE 3

|  | Co:Al | Initial capacity (mAh) | Impedance before storage (Ω) | Impedance after storage (Ω) | Rate of impedance increase (%) |
|---|---|---|---|---|---|
| Battery I | 0.1:0.03 | 278 | 60.0 | 64.4 | 7.3 |
| Battery J | 0.35:0.03 | 234 | 72.3 | 76.8 | 6.2 |
| Battery K | 0.1:0.35 | 172 | 71.0 | 71.8 | 1.1 |
| Battery L | 0.35:0.35 | 129 | 75.8 | 76.2 | 0.5 |

As shown by Table 3, the use of the lithium nickel composite oxides in which 10 to 35 mol % of the nickel atoms is substituted by cobalt atoms and 3 to 35 mol % of the nickel atoms is substituted by aluminum atoms suppresses the rate of impedance increase after storage.

The results of the battery I have shown that when the contents of the cobalt atoms and the aluminum atoms are low, the rate of impedance increase tends to increase slightly. Also, the results of the battery L have shown that when the contents of the cobalt atoms and the aluminum atom are high, the capacity tends to lower slightly.

EXAMPLE 3

This example examined cases where the metal element M of the lithium nickel composite oxide was an element other than aluminum.

(Battery M)

A nickel composite hydroxide represented by $Ni_{0.34}Co_{0.33}Mn_{0.33}(OH)_2$ and lithium hydroxide monohydrate ($LiOH.H_2O$) were mixed such that Li:Ni:Co:Mn=1.08:0.34:0.33:0.33 (molar ratio), to obtain a mixture. A non-aqueous electrolyte secondary battery was produced in the same manner as the battery A except for the use of this mixture. This battery was named battery M. The lithium nickel composite oxide used is represented by $Li_{1.08}Ni_{0.34}Co_{0.33}Mn_{0.33}O_2$.

(Battery N)

A nickel composite hydroxide represented by $Ni_{0.77}Co_{0.2}Ti_{0.03}(OH)_2$ and lithium hydroxide monohydrate ($LiOH.H_2O$) were mixed such that Li:Ni:Co:Ti=1.08:0.77:0.2:0.03 (molar ratio), to obtain a mixture. A non-aqueous electrolyte secondary battery was produced in the same manner as the battery A except for the use of this mixture. This battery was named battery N. The lithium nickel composite oxide used is represented by $Li_{1.08}Ni_{0.77}Co_{0.2}Ti_{0.03}O_2$.

The batteries M to N obtained in the above manner were evaluated in the same manner as in Example 1. Table 4 shows the results.

TABLE 4

|  | Metal element M | Initial capacity (mAh) | Impedance before storage (Ω) | Impedance after storage (Ω) | Rate of impedance increase (%) |
|---|---|---|---|---|---|
| Battery M | Mn | 281 | 70.8 | 73.8 | 4.2 |
| Battery N | Ti | 253 | 67.2 | 71.1 | 5.8 |

Table 4 shows that when the metal element M of the lithium nickel composite oxide is manganese or titanium, the rate of impedance increase after storage is also suppressed.

EXAMPLE 4

This example used the lithium nickel composite oxide (A) where the metal element A was cobalt.

(Battery O)

A nickel composite hydroxide represented by $Ni_{0.97}Co_{0.03}(OH)_2$ and lithium hydroxide monohydrate ($LiOH.H_2O$) were mixed such that Li:Ni:Co=1.08:0.97:0.03 (molar ratio), to obtain a mixture. A non-aqueous electrolyte secondary battery was produced in the same manner as the battery A except for the use of this mixture. This battery was named battery O. The lithium nickel composite oxide used is represented by $Li_{1.08}Ni_{0.97}Co_{0.03}O_2$.

(Battery P)

A nickel composite hydroxide represented by $Ni_{0.7}Co_{0.3}(OH)_2$ and lithium hydroxide monohydrate ($LiOH \cdot H_2O$) were mixed such that Li:Ni:Co=1.08:0.7:0.3 (molar ratio), to obtain a mixture. A non-aqueous electrolyte secondary battery was produced in the same manner as the battery A except for the use of this mixture. This battery was named battery P. The lithium nickel composite oxide used is represented by $Li_{1.08}Ni_{0.7}Co_{0.3}O_2$.

(Battery Q)

A nickel composite hydroxide represented by $Ni_{0.3}Co_{0.7}(OH)_2$ and lithium hydroxide monohydrate ($LiOH \cdot H_2O$) were mixed such that Li:Ni:Co=1.08:0.3:0.7 (molar ratio), to obtain a mixture. A non-aqueous electrolyte secondary battery was produced in the same manner as the battery A except for the use of this mixture. This battery was named battery Q. The lithium nickel composite oxide used is represented by $Li_{1.08}Ni_{0.3}Co_{0.7}O_2$.

The batteries O to Q obtained in the above manner were evaluated in the same manner as in Example 1. Table 5 shows the results.

TABLE 5

| | Molar ratio of Co | Initial capacity (mAh) | Impedance before storage (Ω) | Impedance after storage (Ω) | Rate of impedance increase (%) |
|---|---|---|---|---|---|
| Battery O | 0.03 | 310 | 59 | 63.8 | 8.1 |
| Battery P | 0.3 | 276 | 65.8 | 71.0 | 7.9 |
| Battery Q | 0.7 | 259 | 69.2 | 74.1 | 7.1 |

Table 5 indicates that even when the metal element A contained in the lithium nickel composite oxide (A) is Co only, the rate of impedance increase after storage is suppressed. It also shows that when the molar ratio of Co increases, the capacity tends to lower slightly.

Further, it has been found that the batteries O to Q tend to exhibit slightly higher rates of impedance increase, than, for example, the batteries I to N, which include the lithium nickel composite oxide containing Co and another metal element as the positive electrode active material.

In the foregoing Examples, the lithium nickel composite oxide (B) where the metal element M is Al, Mn or Ti was used; however, even when the metal element M is V, Cr, Fe, or Y, essentially the same effects can be obtained. This holds true of the lithium nickel composite oxide (A).

Also, in the foregoing Examples, non-graphitizable carbon was used as the negative electrode active material; however, natural graphite, artificial graphite, etc., may be used as the negative electrode active material.

Further, in the foregoing Examples, cylindrical batteries were used; however, the use of batteries having, for example, a rectangular shape can produce essentially the same effects.

Furthermore, in the foregoing Examples, the solvent mixture of PC and DMC was used as the solvent of an electrolyte; however, the use of other non-aqueous solvents, for example, cyclic ethers such as ethylene carbonate, chain ethers such as dimethoxyethane, and chain esters such as methyl propionate, or the use of multi solvent mixtures including these non-aqueous solvents can produce essentially the same effects.

Moreover, in the foregoing Examples, $LiPF_6$ was used as the solute of an electrolyte; however, the use of other solutes, for example, lithium salts such as $LiAsF_6$, $LiClO_4$, $LiBF_4$, $LiCF_3SO_3$, $LiSbF_6$, LiSCN, LiCl, $LiC_6HSO_3$, $Li(CF_3SO_2)_2$ and $LiC(CF_3SO_2)_3$, or the use of mixtures of such solutes can produce essentially the same effects.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A positive electrode active material for a non-aqueous electrolyte secondary battery, comprising:
   a lithium nickel composite oxide containing lithium, nickel, and at least one metal element other than lithium and nickel; and
   a film layer containing lithium carbonate, aluminum hydroxide, and aluminum oxide, said layer being evenly coated on the surface of said lithium nickel composite oxide,
   wherein said lithium nickel composite oxide is composed such that the ratio of the nickel to the total of the nickel and said at least one metal element is 30 mol % or more,
   said layer is composed such that the amount of said lithium carbonate is 0.5 to 5 mol per 100 mol of said lithium nickel composite oxide, and
   the total of aluminum atoms contained in said aluminum hydroxide and said aluminum oxide is 0.5 to 5 mol per 100 mol of said lithium nickel composite oxide.

2. The positive electrode active material for a non-aqueous electrolyte secondary battery in accordance with claim 1, wherein said lithium nickel composite oxide is represented by the general formula:

$$Li_aNi_{1-b}A_bO_2$$

($0.98 \leq a \leq 1.1$, $0.03 \leq b \leq 0.7$, and A is at least one metal element selected from the group consisting of Co, Al, Ti, V, Cr, Mn, Fe and Y).

3. The positive electrode active material for a non-aqueous electrolyte secondary battery in accordance with claim 2, wherein said lithium nickel composite oxide is represented by the general formula:

$$Li_xNi_{1-y-z}Co_yM_zO_2$$

($0.98 \leq x \leq 1.1$, $0.1 \leq y \leq 0.35$, $0.03 \leq z \leq 0.35$, and M is at least one metal element selected from the group consisting of Al, Ti, V, Cr, Mn, Fe and Y).

4. A non-aqueous electrolyte secondary battery comprising:
   a positive electrode including the positive electrode active material of claim 1;
   a negative electrode including at least one of lithium metal, a lithium alloy and a material capable of absorbing and desorbing lithium ions; and
   an electrolyte comprising a non-aqueous solvent and a lithium salt dissolved in said non-aqueous solvent.

* * * * *